3,336,296
PREPARATION OF 5-SUBSTITUTED-2H-1,4-
BENZODIAZEPIN-2-ONE-4-OXIDES
Stanley C. Bell, Philadelphia, Scott J. Childress, Newtown
Square, and Theodore S. Sulkowski, Narberth, Pa., assignors to American Home Products Corporation, New York, N.Y., a corporation of Delaware
No Drawing. Filed Oct. 26, 1962, Ser. No. 233,467
8 Claims. (Cl. 260—239.3)

This invention is concerned generally with the preparation of 5-substituted-2H-1,4-benzodiazepin-2-one 4-oxides by new and improved chemical procedures and with novel compounds produced thereby.

The new and improved procedures of this invention constitute a novel process characterized by high yields, ease of operation, high purity of the products as well as other technical advantages which will be apparent to those skilled in the art.

The process of this invention is particularly suitable for the production of compounds having the following structural formula:

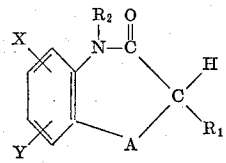

wherein A is selected from the group consisting of:

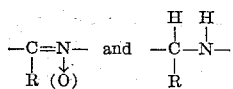

X and Y each may be substituents such as hydrogen, a halogen having an atomic weight not in excess of 80, lower alkyl, nitro and methylsulfonyl, R is a substituent such as methyl, phenyl, thienyl, cyclohexyl, alkoxyphenyl and halophenyl; $R_1$ and $R_2$ are hydrogen or lower alkyl; as well as the strong-acid salts thereof.

These compounds possess valuable central nervous system activity, having significant anti-convulsant and muscle relaxing effects. Some of them exhibit sedative and tranquilizing effects. Certain of them are effective as analgesics. The 4-oxido compounds, in addition to their own pharmacological activities, are also intermediates in the preparation of 3-oxygenated-2H-1,4-benzodiazepin-2-ones, disclosed and claimed in co-pending application Ser. No. 134,569, filed Aug. 24, 1961 and now abandoned.

Broadly stated, the process of this invention comprises the novel combination of the steps of first converting a N-(2-amino-α-substituted benzyl)glycine (II) into a 5-substituted - 1,3,4,5-tetrahydro-2H-1,4 - benzodiazepin-2-one (III). This conversion may be achieved by treating the glycine reactant with phosphorus pentachloride in an inert solvent such as carbon tetrachloride, ether, benzene and the like. Alternatively, the glycine reactant may be heated with a dilute mineral acid such as 1 N hydrochloric acid or sulfuric acid to give the mineral acid salt of a 5-substituted-1,3,4,5-tetrahydro-2H-1,4 - benzodiazepin-2-one which then contacted with a base to remove the mineral acid moiety. Mild oxidation of the 5-substituted-1,3,4,5 - tetrahydro-2H-1,4-benzodiazepin - 2 - one (III) with a weakly acid solution of potassium or sodium permanganate gives a 5-substituted-1,3-dihydro-2H-1,4-benzodiazepin-2-one (IV). Peroxidation of this compound with peracetic acid or hydrogen peroxide in an acetic acid solvent gives the final product, 5-substituted-1,3-dihydro-2H-1,4 - benzodiazepin-2-one 4-oxide (I). The above reactions may be illustrated schematically as follows:

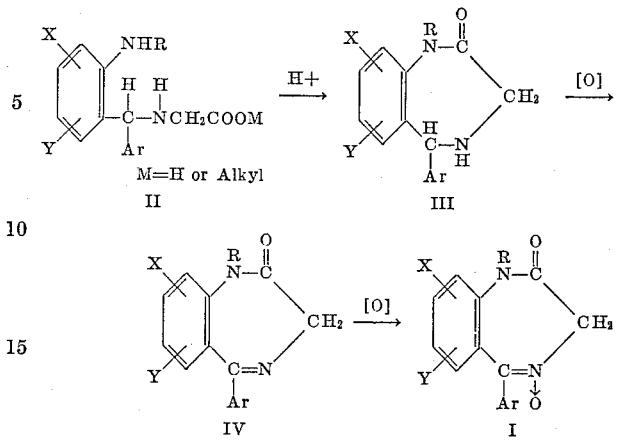

The starting compounds, N-(2-amino-α-substituted-benzyl)glycines, (II), preferably are prepared by one of the following procedures. One procedure involves the reduction of a 2-amino-phenyl-aryl ketone oxime with hydrogen, in the presence of a hydrogenation catalyst such as palladium on charcoal, to form the corresponding 2-amino-α-substituted benzylamine. The latter compound is then reacted with a halogenated aliphatic acid, or with an ester thereof, in a hydroxylic solvent such as aqueous ethanol, in which both reactants are soluble, to form the desired product (II). This last step may be carried out at temperatures ranging from room temperature up to the reflux temperature of the reaction mixture and in the presence or in the absence of a base such as magnesium oxide, sodium carbonate or triethylamine. In some cases when a base is used, the product is recovered in its free acid form even though an ester such as ethyl chloroacetate was used in its preparation. Where the product is recovered in the form of an ester, it may be hydrolyzed to its acid form by heating with a dilute base.

Another recommended procedure for preparing the starting N-(2-amino-α-substituted benzyl)glycine consists in treating a 2-amino-α-substituted benzyl alcohol with thionyl chloride to form the corresponding 2-amino-α-substituted benzyl chloride which is then reacted with the ethyl ester of glycine to form the ethyl ester of the desired starting product.

The following examples illustrate the best mode of carrying out the invention. In these examples all temperatures are given in degree centigrade.

EXAMPLE 1

A solution of 25 g. of 2-amino-5-chlorobenzophenone oxime in 500 ml. of ethanol and 40 ml. of 6 N hydrochloric acid was hydrogenated at 50–60° in the presence of 5 g. of 10% palladium on charcoal until 2 moles of hydrogen had been consumed. The reaction mixture was cooled, filtered from the catalyst, and the solvent removed in vacuo. The product was recrystallized from acetonitrile and isolated as the dihydrochloride salt of 2-amino-5-chloro-α-phenylbenzylamine, M.P. 221–223°.

Analysis calculated for $C_{13}H_{13}ClN_2 \cdot 2HCl$: C, 51.10; H, 4.95; Cl, 34.81; N, 9.17. Found: C, 51.18; H, 4.83; Cl, 34.70; N, 9.06.

EXAMPLE 2

A mixture of 3 g. of 2-amino-5-chloro-α-phenylbenzylamine dihydrochloride, 1.5 g. ethyl chloroacetate, 1.5 g. magnesium oxide, and 75 ml. of 80% ethanol is stirred and refluxed for 18 hours. The mixture is filtered while hot, then evaporated to dryness. The residue is triturated with ethyl acetate and filtered. The solid removed by filtration is stirred in a suspension of 50 ml. of water and 50 ml.

of ethyl acetate while being acidified with acetic acid. After separation of the organic layer and evaporation to dryness, the residue is dissolved in saturated sodium carbonate solution and filtered. On acidification of the filtrate with acetic acid there is obtained N-(2-amino-5-chloro-α-phenylbenzyl)glycine, M.P. 190–192°.

EXAMPLE 3

Three grams of N-(2-amino-5-chloro-α-phenylbenzyl) glycine was suspended in 40 ml. of absolute ethanol and 5 g. of hydrogen chloride was added. After standing for 48 hours, the solution was concentrated in vacuo at room temperature and the residue of N-(2-amino-5-chloro-α-phenylbenzyl)glycine, ethyl ester dihydrochloride was treated with dilute sodium carbonate solution to afford the free base, M.P. 102–104°.

EXAMPLE 3A

Five grams of N-(2-amino-5-chloro-α-phenylbenzyl) glycine in 100 ml. of 1 N hydrochloric acid was heated on the steam bath for ten minutes to afford a precipitate of 7 - chloro - 5 - phenyl - 1,3,4,5 - tetrahydro - 2H - 1,4-benzodiazepin-2-one hydrochloride, M.P. 268–270°. This was converted to the base by dissolving in 50% aqueous alcohol and treating the solution with sufficient sodium hydroxide solution to give an alkaline reaction. The base so obtained melted at 183–185°.

EXAMPLE 3B

One-half gram of N-(2-amino-5-chloro-α-phenylbenzyl)glycine, ethyl ester, was dissolved in 10 ml. of 1 N hydrochloric acid and heated on the steam bath for ten minutes to afford 7-chloro-5-phenyl-1,3,4,5-tetrahydro-2H-1,4-benzodiazepin-2-one hydrochloride as in Example 3A.

EXAMPLE 3C

Two grams of N-(2-amino-5-chloro-α-phenylbenzyl) glycine was heated on the steam bath for five minutes with 30 ml. of 1 N sulfuric acid. The solution was cooled and made basic with ammonia to afford 7-chloro-5-phenyl-1,3,4,5-tetrahydro-2H-1,4-benzodiazepin-2-one, M.P. 183–185°.

EXAMPLE 4

Three grams of 2-amino-5-chloro-α-phenylbenzylamine dihydrochloride in 15 ml. of ethanol was treated with 3 g. of triethylamine and 1.7 g. of ethyl bromoacetate. After standing 48 hours at room temperature 100 ml. of water was added, precipitating an oil that was extracted into ether. Evaporation of the ether afforded N-(2-amino-5-chloro-α-phenylbenzyl)glycine, ethyl ester, identical with that prepared in Example 3.

EXAMPLE 5

One gram of N-(2-amino-5-chloro-α-phenylbenzyl) glycine in 25 ml. of ether was treated with 1 g. of phosphorus pentachloride at 0° C. for 20 minutes, the temperature allowed to rise to room temperature for 1 hour followed by heating under reflux for one-half hour. Water (50 ml.) was cautiously added to the cooled mixture and the aqueous layer was separated and made basic with sodium hydroxide solution. The 7-chloro-5-phenyl-1,3,4,5-tetrahydro-2H-1,4-benzodiazepin-2-one was collected and recrystallized from aqueous alcohol. It melted at 183–185° C.

EXAMPLE 6

To a warm solution of 2.0 g. of 7-chloro-5-phenyl-1,3,4,5-tetrahydro-2H-1,4-benzodiazepin-2-one in dilute aqueous hydrochloric acid was added dropwise a solution of potassium permanganate until the color was no longer dissipated. The reaction mixture was filtered and the filtrate was neutralized with sodium carbonate solution. The resultant solid was collected and recrystallized from alcohol giving 7-chloro-5-phenyl-1,3-dihydro-2H-1,4-benzodiazepin-2-one, M.P. 214–216° C.

EXAMPLE 7

One gram of 7-chloro-5-phenyl-1,3-dihydro-2H-1,4-benzodiazepin-2-one was dissolved in a solution of 25 ml. of glacial acetic acid containing 0.38 g. of peracetic acid. After standing at room temperature for 24 hours, the mixture was diluted with 200 ml. of water and neutralized with sodium carbonate. 7-chloro-5-phenyl-1,3-dihydro-2H-1,4-benzodiazepin-2-one 4-oxide was filtered off and recrystallized from ethanol to give white plates, M.P. 238–239° C.

The compounds prepared by the process of this invention may be combined with various pharmaceutically acceptable carriers for oral or parenteral administration.

The subject matter which the applicants regard as their invention is particularly pointed out and distinctly claimed as follows:

1. A process comprising converting a N-(2-amino-α-substituted benzyl)glycine into a 5-substituted-1,3,4,5-tetrahydro-2H-1,4-benzodiazepin-2-one; treating the latter compound with a mild oxidizing agent to form the corresponding 5-substituted-1,3-dihydro-2H-1,4-benzodiazepin-2-one and peroxidizing the last-named compound to form the desired product.

2. Process according to claim 1, wherein said N-(2-amino-α-substituted-benzyl)glycine is prepared by reducing a 2-aminophenyl ketone oxime to the corresponding 2-amino-α-substituted benzylamine; and then reacting the latter product with a compound selected from the group consisting of halogenated aliphatic acids and the esters thereof.

3. Process according to claim 1, wherein said N-(2-amino-α-substituted-benzyl)glycine is treated, in an inert solvent, with phosphorus pentachloride to form said 5-substituted - 1,3,4,5 - tetrahydro - 2H - 1,4 - benzodiazepin-2-one.

4. Process according to claim 1, wherein said N-(2-amino-α-substituted-benzyl)glycine is heated with a dilute mineral acid to form said 5-substituted-1,3,4,5-tetrahydro-2H-1,4-benzodiazepin-2-one.

5. Process according to claim 1, wherein said 5-substituted - 1,3,4,5-tetrahydro-2H-1,4-benzodiazepin-2-one is oxidized with a dilute acid solution containing a permanganate oxidizing agent to form said 5-substituted-1,3-dihydro-2H-1,4-benzodiazepin-2-one.

6. Process according to claim 1, wherein said 5-substituted-1,3-dihydro-2H-1,4-benzodiazepin-2-one is peroxidized in acetic acid solution with a peroxidizing agent selected from the group consisting of peracetic acid and hydrogen peroxide to form a 5-substituted-2H-1,4-benzodiazepin-2-one 4-oxide.

7. The process which comprises hydrogenating in acid media in the presence of catalytic amounts of a hydrogenation catalyst a 2-aminophenyl arylketone oxime to form the acid salt of a 2-amino-α-phenylbenzylamine, refluxing the latter compound with a haloacetic acid ester preferably in the presence of a base selected from the group consisting of magnesium oxide, sodium carbonate and triethylamine to form a N-(amino-α-phenylbenzyl)glycine; treating the latter product with phosphorus pentachloride to form a 5-phenyl-1,3,4,5-tetrahydro-2H-1,4-benzodiazepin-2-one; oxidizing the latter product with a dilute acid solution containing an oxidizing agent to form the corresponding 5-phenyl - 1,3-dihydro-2H - 1,4-benzodiazepin-2-one and peroxidizing said latter product with a peroxidizing agent selected from the group consisting of peracetic acid and hydrogen peroxide to form a 1,3-dihydro-2H-1,4-benzodiazepin-2-one 4-oxide.

8. The process which comprises hydrogenating in an acid medium in the presence of a hydrogenation catalyst, a 2-aminophenyl arylketone oxime to form the acid salt of a 2-amino-α-phenylbenzylamine, refluxing the latter compound with a haloacetic acid ester, preferably in the presence of a base selected from the group consisting of magnesium oxide, sodium carbonate and triethylamine to form a N-(2-amino-α-phenylbenzyl)glycine; heating the latter compound with a dilute mineral acid to form the mineral acid salt of a 5-phenyl-1,3,4,5-tetrahydro-2H-1,4-benzodiazepin-2-one; treating said salt with a base to form the corresponding 5-phenyl-1,3,4,5-tetrahydro-2H-1,4-benzodiazepin-2-one; oxidizing said latter compound with a solution containing an oxidizing agent, thereby forming a 5 - phenyl - 1,3 - dihydro - 2H - 1,4 - benzodiazepin - 2- one and then peroxidizing said latter compound with a peroxidizing agent selected from the group consisting of peracetic acid and hydrogen peroxide to form a 1,3-dihydro-2H-1,4-benzodiazepin-2-one 4-oxide.

References Cited

UNITED STATES PATENTS

| | | | |
|---|---|---|---|
| 2,828,341 | 3/1958 | Adams et al. | 260—570 |
| 2,830,088 | 4/1958 | Hubner | 260—570 |
| 3,075,968 | 1/1963 | Krapcho | 260—239.3 |
| 3,100,770 | 8/1963 | Fryer et al. | 260—239.3 |
| 3,173,912 | 3/1965 | Krapcho | 260—239.3 |

OTHER REFERENCES

Culvenor: Reviews Pure and Applied Chem., vol. 3, pp. 83 and 86–88 (1953).

Elderfield: Heterocyclic Compounds, vol. 6 (New York, 1957), pp. 492–493.

Groggins: Unit Processes in Organic Synthesis (New York, 1947), pp. 429–430.

Houben-Weyl: Methoden der Organischen Chemie, vol. 11/2 (Stuttgart, 1958), pp. 3–14.

Wagner et al.: Synthetic Organic Chemistry (New York, 1953), pp. 546–547, 658 and 668–670.

ALTON D. ROLLINS, *Primary Examiner.*

NICOLAS S. RIZZO, *Examiner.*